Nov. 27, 1928.

M. H. DAMERELL 1,693,335

LOADING AND UNLOADING ATTACHMENT FOR TRACTORS

Filed May 13, 1926     4 Sheets-Sheet 1

Nov. 27, 1928.
M. H. DAMERELL
1,693,335
LOADING AND UNLOADING ATTACHMENT FOR TRACTORS
Filed May 13, 1926
4 Sheets-Sheet 3
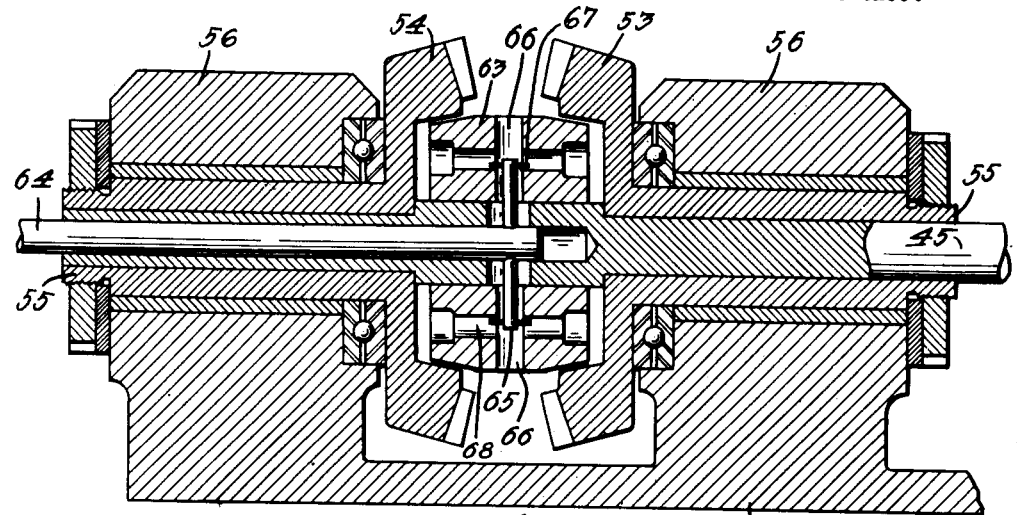
Fig. 3.
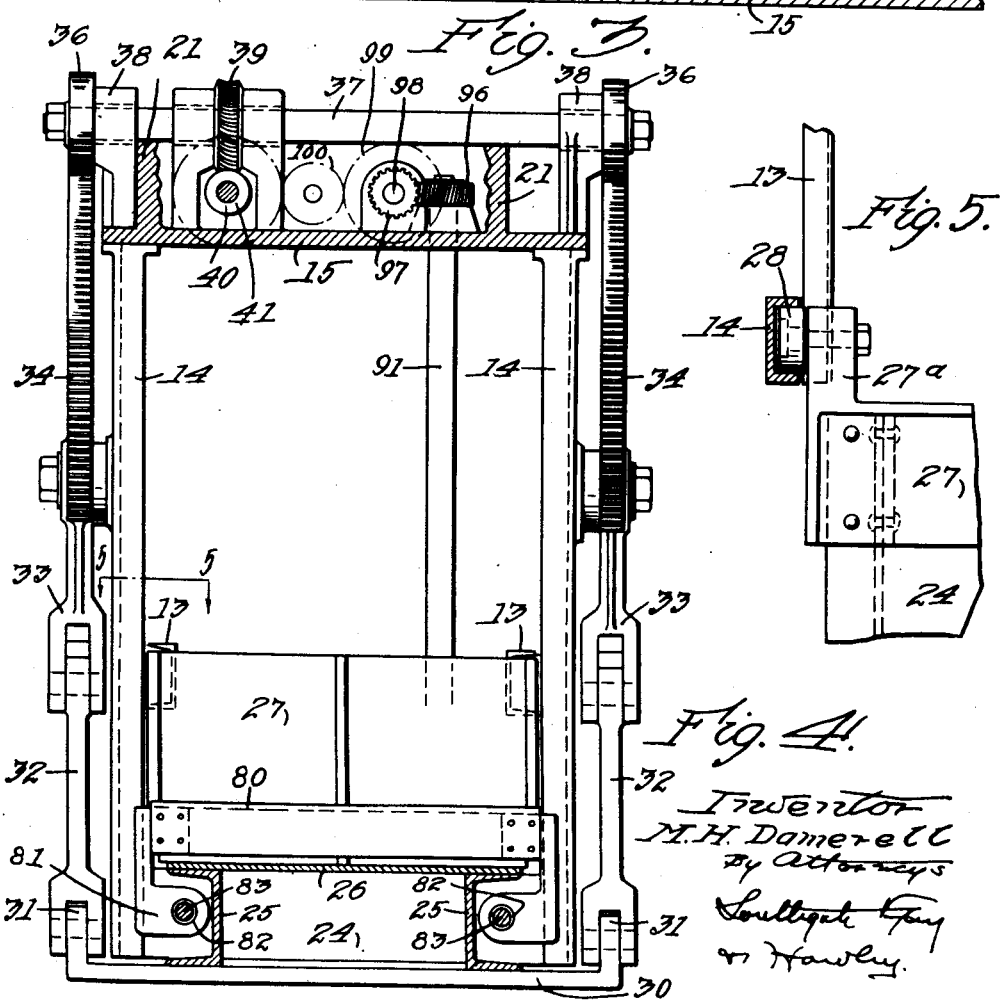
Fig. 4.
Fig. 5.
Inventor
M. H. Damerell
By Attorneys
Southgate Guy
& Hawley.

Nov. 27, 1928.
M. H. DAMERELL
1,693,335
LOADING AND UNLOADING ATTACHMENT FOR TRACTORS
Filed May 13, 1926  4 Sheets-Sheet 4
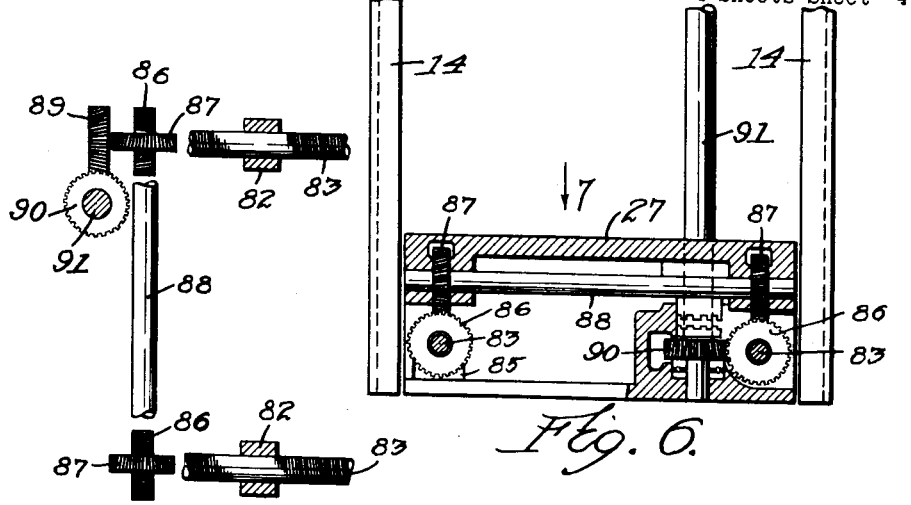
Fig. 6.
Fig. 7.
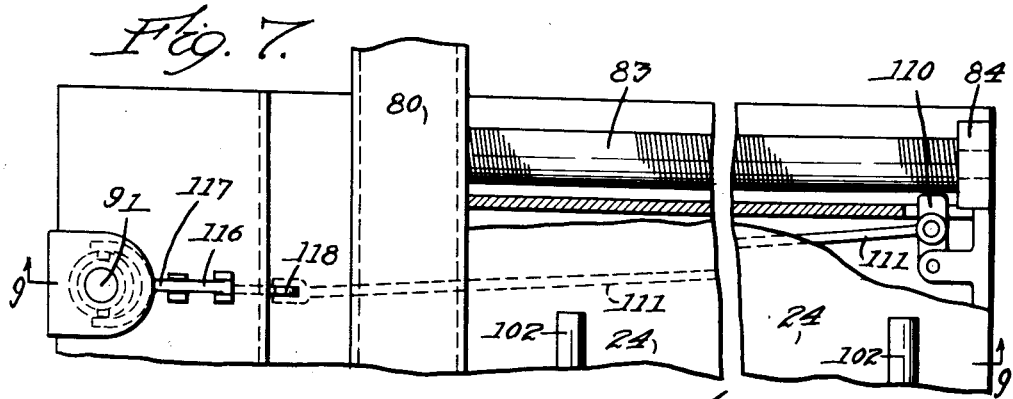
Fig. 8.
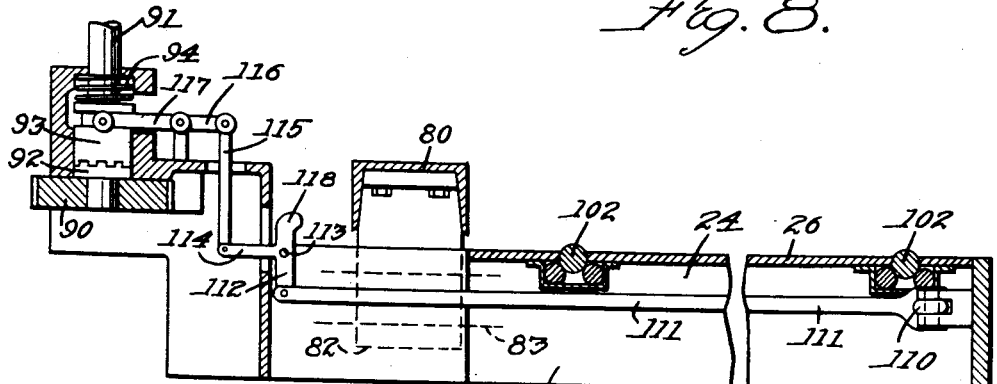
Fig. 9.
Inventor
M. H. Damerell
By Attorneys
Southgate Fayr Hawley Patented Nov. 27, 1928.

1,693,335

UNITED STATES PATENT OFFICE.

MARK H. DAMERELL, OF WORCESTER, MASSACHUSETTS, ASSIGNOR TO WYMAN-GORDON COMPANY, OF WORCESTER, MASSACHUSETTS, A CORPORATION OF MASSACHUSETTS.

LOADING AND UNLOADING ATTACHMENT FOR TRACTORS.

Application filed May 13, 1926. Serial No. 108,944.

This invention relates to a loading and unloading attachment for use on a small tractor.

It is the general object of my invention to produce a device by which relatively heavy bodies, such as large forging dies, may be loaded and transported, and by which they may be easily unloaded at any desired point. Such a combined machine has been found extremely useful in shops and factories where large forgings and heavy machine parts are manufactured, and the machine is also useful for many other similar purposes.

A further object of my invention is to provide convenient operating mechanism by means of which the load may be picked up or deposited as desired and by which the load may be drawn onto the load supporting table or may be pushed from the front or outer end thereof at the unloading point.

My invention also relates to certain arrangements and combinations of parts which will be hereinafter described and more particularly pointed out in the appended claims.

A preferred form of the invention is shown in the drawings in which

Fig. 3 is a sectional view of a part of the driving mechanism, taken along the line 3—3 of Fig. 2;

Fig. 4 is a front elevation of the attachment, with certain parts shown in section;

Fig. 5 is a detail sectional plan view, taken along the line 5—5 in Fig. 1;

Fig. 6 is a detail sectional front elevation of certain driving connections, taken substantially along the line 6—6 in Fig. 2;

Fig. 7 is a plan view of the same driving connections, looking in the direction of the arrow 7 in Fig. 6;

Fig. 8 is a plan view of a portion of the loading attachment, partially broken away to show a safety device;

Fig. 9 is a sectional side elevation taken along the line 9—9 in Fig. 8; and

Fig. 10 is a detail sectional elevation, taken along the line 10—10 in Fig. 2.

Figure 1:
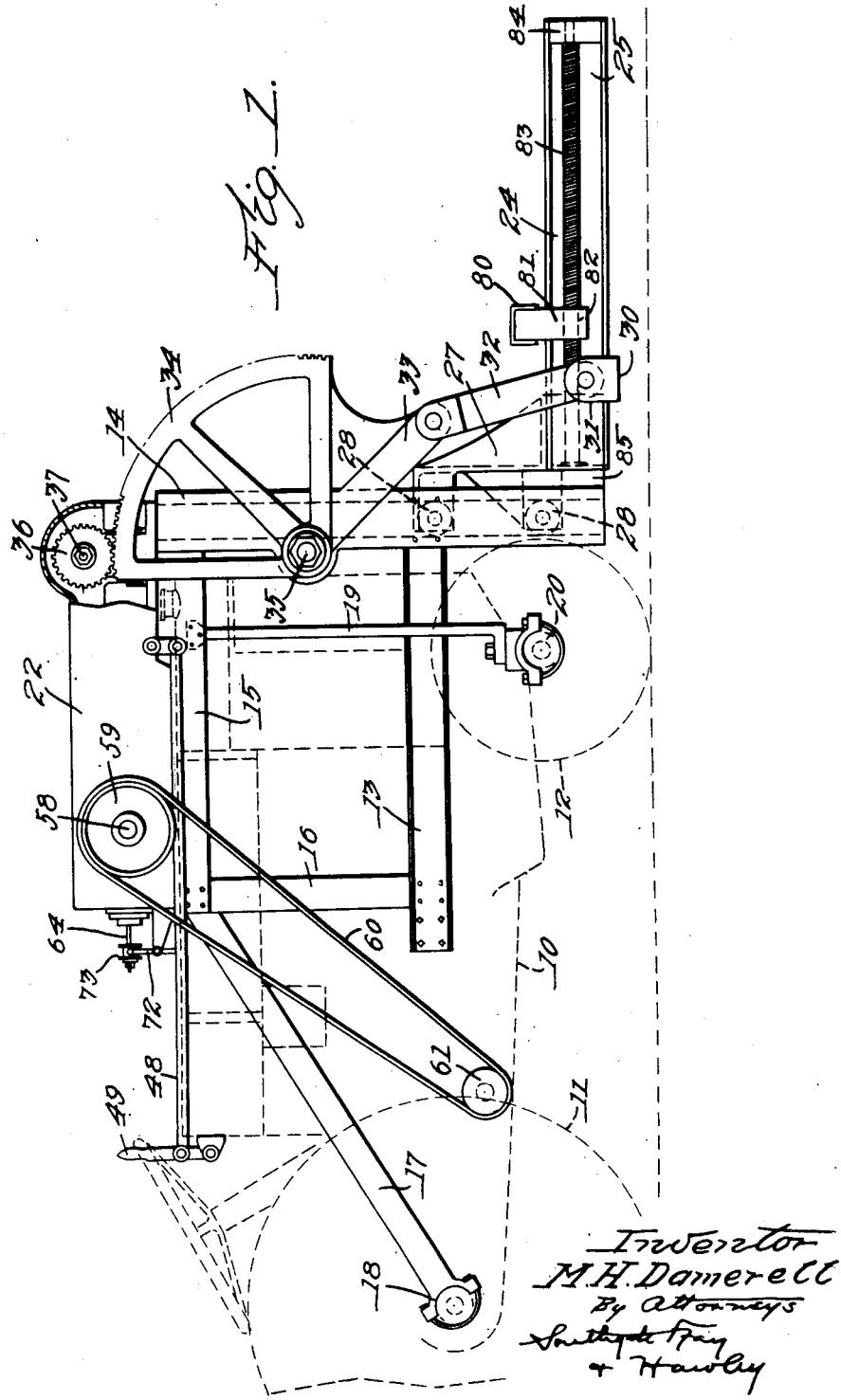
Fig. 1 is a side elevation of a portion of a tractor, with my improvements applied thereto.

General construction.

Referring to the drawings, I have indicated in dotted lines a commercial tractor of a usual form, having a frame 10, rear or driving wheels 11, and front or steering wheels 12.

My improved loading and unloading attachment comprises a frame work which is mounted on side frame members 13, rigidly secured to the casing 10. Upright guide bars 14 are secured to the forward ends of the bars 13, said guide bars being connected at their upper ends by a frame member 15 (Fig. 4). The upper frame member 15 extends rearward as indicated in Fig. 1 and is connected by a brace 16 to the lower frame member 13. The rear upper portion of the supporting frame is also connected by braces 17 to the rear axle casing 18 of the tractor, and additional braces 19 are also supported by the front axle 20 of the tractor, these latter braces carrying the greater part of the load on the attachment.

Upwardly extended portions 21 of the frame member 15 form a support for certain operating and controlling mechanism, the latter being normally protected by a cover or casing 22 (Fig. 1).

The load-supporting platform 24 comprises forwardly projecting frame members 25 (Figs. 1 and 9), supporting a flooring 26. The rear ends of the frame members 25 are connected by a frame member 27 having upwardly projecting bracket portions 27ᵃ at the rear or inner end of the platform, which provide bearings for upper and lower guide rolls 28. These guide rolls 28 are freely movable vertically in the fixed guideways 14 previously described, as clearly indicated in Fig. 5.

Elevating mechanism.

I will now describe the mechanism by which the platform 24 may be raised to pick up or elevate the load, or may be lowered to discharge the same. For this purpose, a cross bar 30 (Fig. 4) is secured below the frame members 25 of the platform 24, said cross bar having upturned ends 31 to which are pivoted a pair of links 32. Each of these links 32 is pivoted at its upper end to an arm 33 (Fig 1), formed integral with a segment gear or quadrant 34 which is rotatable about a stud 35 fixed in one of the side bars 14 of the supporting frame.

The segment gears 34 are engaged by pinions 36 secured to the end of a cross shaft 37 (Fig. 4), supported in bearings 38 on the frame member 15 A worm gear 39 on the shaft 37 is engaged by a worm 40 (Fig. 10), mounted on a sleeve 41 which is freely rotatable in bearings 43 and which has a clutch member 44 secured to the rear end thereof.

Figure 2:
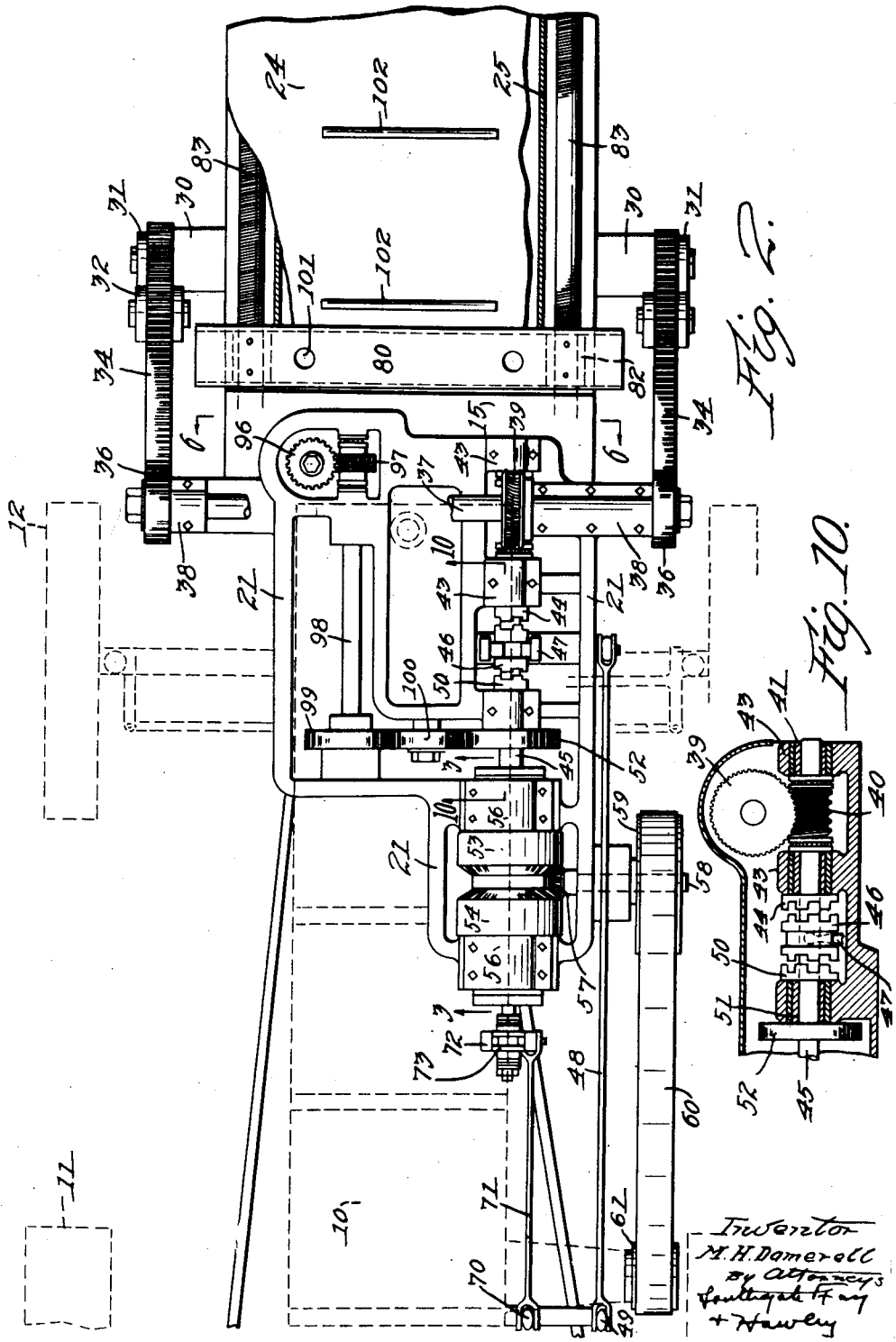
Fig. 2 is an enlarged plan view of my loading and transporting attachment.

A shaft 45 is rotatably mounted within and extends freely through the sleeve 41. A double clutch member 46 is keyed to the shaft 45 and is movable axially thereon by a yoke 47 (Fig. 2), which is connected by a link 48 to a hand lever 49 by which it may be caused to engage the clutch member 44 when it is desired to operate the elevating mechanism.

When the double clutch 46 is moved rearward, it engages a second clutch member 50 (Fig. 10) on a sleeve 51 which carries a spur gear 52 which is connected to operate the loading and unloading mechanism which will be hereinafter described.

A pair of bevel gears 53 and 54 (Fig. 3) are mounted upon sleeves 55 freely rotatable in bearings 56 on the frame member 15. The gears 53 and 54 are engaged by a bevel pinion 57 (Fig. 2), mounted upon a short horizontal shaft 58 having a pulley or sprocket 59 connected by a belt or chain 60 to a driving pulley or sprocket 61 which forms a part of the standard equipment of the tractor. The pulley 61 may be rotated continuously, whether the tractor is moving or standing still, as it is directly connected to the engine independently of the wheel-driving mechanism. By the construction above described, the bevel gears 53 and 54 may be rotated continuously but in opposite directions.

These bevel gears 53 and 54 are provided with conical internal friction surfaces, adapted to be engaged by a double cone clutch member 63 (Fig. 3) which is keyed to the shaft 45. The double cone clutch is controlled by a rod 64 extending through an axial opening in the shaft 45 and having a cross pin 65 extending transversely through slots in the shaft 45 and into radial openings 66 in the double cone clutch member 63. Cotter pins 67 or equivalent fastening devices may be inserted in the pin 65 through openings 68 in the clutch member 63, thus permitting convenient assembling of the parts and preventing displacement of the cross pin 65.

The rod or plunger 64 is operated from a hand lever 70 (Fig. 2) through a link 71 and a yoke lever 72 (Fig. 1) engaging a grooved collar 73 on the rear end of the rod 64.

The shaft 45 may thus be connected to a selected bevel gear 53 or 54 to rotate continuously in either direction as desired, and may also be started and stopped by manipulation of the hand lever 70. The shaft 45 may also be operatively connected either to the elevating mechanism or to the loading mechanism to be described, by shifting the hand lever 49 forward or rearward.

Assuming that the hand lever 49 is shifted forward, the shaft 45 will be connected to the elevating mechanism and the load-supporting table 24 may be raised or lowered by shifting the hand lever 70 in the desired direction, or the table may be stopped in any desired position by placing the hand lever 70 in neutral position. The worm drive of the cross shaft 37 is non-reversible and constitutes a locking device which will hold the table 24 in any desired position, thus avoiding the necessity for the use of brakes or catches to hold the load.

*Loading and unloading mechanism.*

I will now describe the mechanism which I have provided for pulling the load onto the table 24 or for discharging the load therefrom.

For this purpose I provide a cross beam or loading member 80 (Figs. 1 and 4), slidable above the platform 24 and having depending brackets 81 offset inwardly beneath the edges of the loading platform and provided with threaded portions or nuts 82. Screw shafts 83 are threaded in the nuts 82 and are rotatably mounted in bearings 84 and 85 (Fig. 1) in the platform frame. At their rear ends, the shafts 83 are provided with spiral gears 86 (Fig. 6) engaged by corresponding spiral gears 87 on a cross shaft 88 mounted in bearings in the platform end frame member 27. The screw shafts 83 are thus connected to rotate simultaneously and in the same direction.

A second spiral gear 89 (Fig. 7) on one of the screw shafts 83 is engaged by a corresponding spiral gear 90 (Fig. 6) which is freely rotatable about the lower end of an upright shaft 91, and which is provided with a clutch member 92 (Fig. 9) on its upper face. A sliding clutch collar 93 is keyed to the shaft 91 and is normally held downward to engage the clutch member 92 by a spring 94 encircling the shaft 91. Certain safety devices for raising the clutch collar 93 under abnormal conditions will be hereinafter described.

At its upper end, the shaft 91 is provided with a spiral gear 96 (Fig. 4) engaged by a spiral gear 97, mounted at the front end of a countershaft 98 (Fig. 2) and provided with suitable thrust bearings to take up the end pressure thereon. At its rear end, the countershaft 98 is provided with a spur gear 99 engaging an idle gear 100, which in turn engages the spur gear 52 previously described.

If the double clutch member 46 is moved rearward to engage the clutch member 50, the driving mechanism is then connected to move the cross beam or loading member 80 along the load-supporting platform 24, the amount and direction of movement being controlled by the hand lever 70.

Openings 101 (Fig. 2) are provided in the cross beam 80 to which a chain hook or other securing device may be attached, so that a heavy die block or other article may be pulled onto the loading platform 24 without manual effort. The platform is also preferably provided with a plurality of anti-friction rollers 102 (Fig. 9), extending crosswise of the platform and facilitating the loading or unloading of heavy articles by substantially reducing the friction as the articles are moved along the surface of the table.

Safety devices.

The endwise movement of the cross beam or loading device 80 is definitely limited by the construction of the table and it is necessary to provide means to prevent injury to the apparatus if the operator carelessly allows the cross beam to overrun its travel in either direction. For this purpose, I have provided the safety devices best shown in Figs. 8 and 9.

At the outer end of the table I provide a horizontally disposed safety arm 110 (Fig. 8), positioned for engagement by one of the nuts 82 on the cross beam 80 as said beam approaches its outer limit of travel.

The safety arm 110 is connected by a link 111 (Fig. 9) to the lower end of a three armed lever 112, mounted on a pivot 113 at the inner or rear end of the loading table. A rearwardly projecting portion 114 of the lever 112 is connected by a link 115 to the forwardly projecting arm 116 of a yoke lever 117 engaging the clutch collar 93 previously described. The third or upwardly projecting arm 118 of the three armed lever 112 is positioned for engagement by the cross beam or loading member 80 at its rearward or left hand limit of travel.

If the nut 82 engages the safety arm 110, forcing the same to the right as viewed in Fig. 8, the arm 114 of the three armed lever will be depressed and the yoke 117 will raise the clutch collar 93 out of engagement with the clutch member 92 on the spiral gear 90, thus immediately stopping further outward movement of the loading member 80.

As the member 80 reaches its inward limit of travel it engages the portion 118 of the three armed lever 112 and similarly disengages the clutch members 92 and 93. It is thus impossible to cause the loading member 80 to overrun its limits of travel in either direction.

General operation.

Having thus described my invention, the operation and advantages thereof are believed to be readily apparent, but may be briefly summarized as follows:—

The loading and unloading attachment is entirely supported upon the tractor frame and thus takes advantage of the short wheel base and easy manipulation of the tractor, which is particularly desirable when used in manufacturing plants in which the operating space is very much restricted. The loading platform may be pushed under the load to be transported, and the platform may then be raised by manipulation of the levers 49 and 70, which are both within easy reach of the tractor operator.

If the load is of such a nature that the loading platform cannot be inserted beneath it, the platform can be placed at a level with the load and the load may then be hauled onto the platform by connecting it with the cross beam or loading member 80 and then applying power to the loading screws 83. This is frequently desirable when handling very heavy articles, such as die blocks used for drop forging.

When such a die block is to be unloaded from the tractor, the platform is raised to the desired elevation and the loading member 80 is then moved outward to push the die block from the table 24 and onto the base or frame of a drop forging or other machine.

Very heavy loads may thus be loaded, transported and unloaded entirely by the tractor operator, and without any manual effort and without the services of additional workmen. Furthermore the load is automatically held at any desired elevation, as the worm drive of the segment gears 34 is non-reversible.

If the operator carelessly allows the loading member 80 to run beyond its limit of travel in either direction, the driving mechanism for the member 80 is automatically disconnected by the safety devices above described.

Having described my invention and the advantages thereof, I do not wish to be limited to the details herein disclosed otherwise than as set forth in the claims, but what I do claim is:—

1. A loading and transporting attachment for a tractor having a main frame comprising a supplemental frame fixed to said main frame of said tractor and projecting forward in front of said tractor frame, said supplemental frame having substantially vertical guide-ways thereon, a work-supporting table mounted for extended vertical movement in said guide-ways on said supplemental frame, loading means mounted on said table and movable therealong for moving the load relative to said table and means selectively operative to drive said tractor or to raise or lower said table in said guide-ways.

2. A loading and transporting attachment for a tractor comprising a frame fixed to said tractor, a load-supporting table mounted for vertical movement on said frame, loading means mounted on said table and movable therealong for moving the load onto or off of said table, and tractor-operated mechanism effective for selectively raising or lowering said table and for moving said loading means to move a load inward or outward along said table.

3. A loading and transporting attachment for a tractor comprising a frame fixed to said tractor, a load-supporting table mounted for vertical movement on said frame, loading means movable along said table for moving the load onto or off of said table, tractor-operated mechanism effective for selectively raising or lowering said table and for moving said loading means inward or outward along said table, and stopping devices effective to prevent over-running of said loading means in either direction.

4. A loading and transporting attachment for a tractor comprising a frame fixed to said tractor, a load-supporting table mounted for vertical movement on said frame, segmental gears pivoted on said frame, links connecting said gears to said table, and tractor-operated mechanism effective to move said gears simultaneously angularly, thereby moving said table vertically.

5. A loading and transporting attachment for a tractor comprising a frame fixed to said tractor, a load-supporting table mounted for vertical movement on said frame, segmental gears pivoted on said frame, links connecting said gears to said table, and tractor-operated mechanism effective to move said gears simultaneously angularly, thereby moving said table vertically, said operating mechanism including a non-reversible worm and worm gear drive effective to hold said table at any desired elevation.

6. A loading and transporting attachment for a tractor comprising a frame fixed to said tractor, a load-supporting table mounted for vertical movement on said frame, loading means mounted on said table and movable therealong for moving the load onto or off of said table, elevating mechanism for said table, operating mechanism for said loading means, tractor-operated driving mechanism, and selective means for connecting said driving mechanism to said elevating mechanism or to said operating mechanism.

7. A loading and transporting attachment for a tractor comprising a frame fixed to said tractor, a load-supporting table mounted for vertical movement on said frame, loading means mounted on said table and movable therealong for moving the load onto or off of said table, elevating mechanism for said table, operating mechanism for said loading means, tractor-operated driving mechanism, and selective means for connecting said driving mechanism to said elevating mechanism or to said operating mechanism, and for stopping or reversing said driving mechanism.

8. A loading and transporting attachment for a tractor having a main frame, comprising a supplemental frame fixed to said main frame of said tractor and projecting forward in front of said tractor frame, said supplemental frame having substantially vertical guide-ways thereon, a work-supporting table mounted for extended vertical movement in said guide-ways on said supplemental frame, loading means mounted on said table and movable therealong for moving the load relative to said table, and means selectively operative to drive said tractor or to raise or lower said table in said guide-ways, said lowering means including segmental gears pivoted on the main frame and linked to said table.

In testimony whereof I have hereunto affixed my signature.

MARK H. DAMERELL.